(12) United States Patent
Lançon

(10) Patent No.: US 9,028,760 B2
(45) Date of Patent: May 12, 2015

(54) DEVICE WITH SEVERAL REACTION CHAMBERS FOR IMPLEMENTING LIQUID/SOLID OXIDATION-REDUCTION REACTIONS IN A FLUIDIZED BED

(75) Inventor: Franck Lançon, Antofagasta (CL)

(73) Assignee: Guillaume Lefort, London (GB)

( * ) Notice: Subject to any disclaimer, the term of this patent is extended or adjusted under 35 U.S.C. 154(b) by 0 days.

(21) Appl. No.: 14/236,140

(22) PCT Filed: Jul. 31, 2012

(86) PCT No.: PCT/FR2012/000321
§ 371 (c)(1),
(2), (4) Date: Jan. 30, 2014

(87) PCT Pub. No.: WO2013/017751
PCT Pub. Date: Feb. 7, 2013

(65) Prior Publication Data
US 2014/0219877 A1 Aug. 7, 2014

(30) Foreign Application Priority Data
Aug. 2, 2011 (FR) ...................................... 11 02424

(51) Int. Cl.
*B01J 8/18* (2006.01)
*B01J 8/20* (2006.01)
(Continued)

(52) U.S. Cl.
CPC *B01J 8/20* (2013.01); *B01J 8/1827* (2013.01); *B01J 8/28* (2013.01); *B01J 8/40* (2013.01); *B01F 11/0266* (2013.01); *B01F 13/0809* (2013.01); *B01J 8/006* (2013.01); *B01J 8/007* (2013.01); *C21B 13/0033* (2013.01);
(Continued)

(58) Field of Classification Search
CPC .................. B01J 8/40; B01J 8/28; B01J 8/20
USPC .................................................. 422/140, 142
See application file for complete search history.

(56) References Cited

U.S. PATENT DOCUMENTS

| 4,084,958 A | 4/1978 | Collin et al. |
| 4,224,056 A | 9/1980 | Tomizawa et al. |
| 6,616,730 B1 | 9/2003 | Bienvenu |

FOREIGN PATENT DOCUMENTS

| FR | 2 882 664 A1 | 9/2006 |
| WO | WO 00/47318 | 8/2000 |
| WO | WO 03/080874 A1 | 10/2003 |

OTHER PUBLICATIONS

Nov. 2, 2012 Search Report issued in International Patent Application No. PCT/FR2012/000321 (with translation).

*Primary Examiner* — Lessanework Seifu
(74) *Attorney, Agent, or Firm* — Oliff PLC

(57) ABSTRACT

Disclosed is a device for carrying out liquid/solid oxidation-reduction reactions in a fluidized bed including a reactor body extending along a longitudinal axis, means for injecting a solution to be processed via a first end of the reactor body along the longitudinal axis, means for performing feeding of a reactive metal via a second end of the reactor body opposite the first end along the longitudinal axis, means for stirring the solution in the reactor body, and a finishing compartment mounted at the second end of the reactor body and connected to means for expelling the processed solution. The reactor body includes two distinct reaction chambers, each reaction chamber having a constant cross-section perpendicularly to the longitudinal axis, said cross-sections of the two reaction chambers being different and increasing from the first end to the second end.

9 Claims, 3 Drawing Sheets

(51) Int. Cl.
*B01J 8/28* (2006.01)
*B01J 8/40* (2006.01)
*B01F 11/02* (2006.01)
*B01F 13/08* (2006.01)
*B01J 8/00* (2006.01)
*C21B 13/00* (2006.01)

(52) U.S. Cl.
CPC . *B01J2219/00038* (2013.01); *B01J 2219/0004* (2013.01); *B01J 2219/185* (2013.01); *B01J 2219/1946* (2013.01)

DEVICE WITH SEVERAL REACTION CHAMBERS FOR IMPLEMENTING LIQUID/SOLID OXIDATION-REDUCTION REACTIONS IN A FLUIDIZED BED

BACKGROUND OF THE INVENTION

The invention relates to a device for carrying out liquid/solid oxidation-reduction, or redox, reactions in a fluidized bed.

STATE OF THE ART

Liquid/solid redox reactions in a fluidized bed can be used in several fields, in particular in hydrometallurgy for extraction of metals diluted in solutions. To enhance these liquid/solid reactions, several devices have been proposed.

For example purposes, Patent application WO 00/47318 describes a cementation method using a fluidized bed reactor. In order to improve the efficiency of the reaction, the described device is provided with electro-magnets enabling stirring of the solution to be processed in the reactor body. Patent application FR 2882664 further describes a device for carrying out cementation using ultrasonic stirring means of the solution to be processed and of the particles of the reactive metal in the device. The yields of the reactions carried out by these conventional reactors may be insufficient, especially when feeding of the solution to be processed is performed with a high flow rate. Known devices can also present other drawbacks causing pollution of the formed solids by the reactive metal and also compounds present in the solution that is fed in.

OBJECT OF THE INVENTION

The object of the invention is to achieve an improvement of the yields of liquid/solid redox reactions in a fluidized bed carried out by known devices accompanied by a reduction of pollution of the formed solids.

This object tends to be achieved by the fact that the device comprises a reactor body extending along a longitudinal axis, means for feeding a solution to be processed via a first end of the reactor body along the longitudinal axis, means for performing feeding of a reactive metal via a second end of the reactor body opposite the first end along the longitudinal axis, means for stirring the solution in the reactor body, and a finishing compartment mounted at the second end of the reactor body and connected to means for removing the processed solution. The reactor body of the device further comprises two distinct reaction chambers, each reaction chamber having a constant cross-section perpendicularly to the longitudinal axis, said cross-sections of the two reaction chambers being different and increasing from the first end to the second end.

The removal means are preferably connected to an additional reactor provided with mechanical stirring means.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
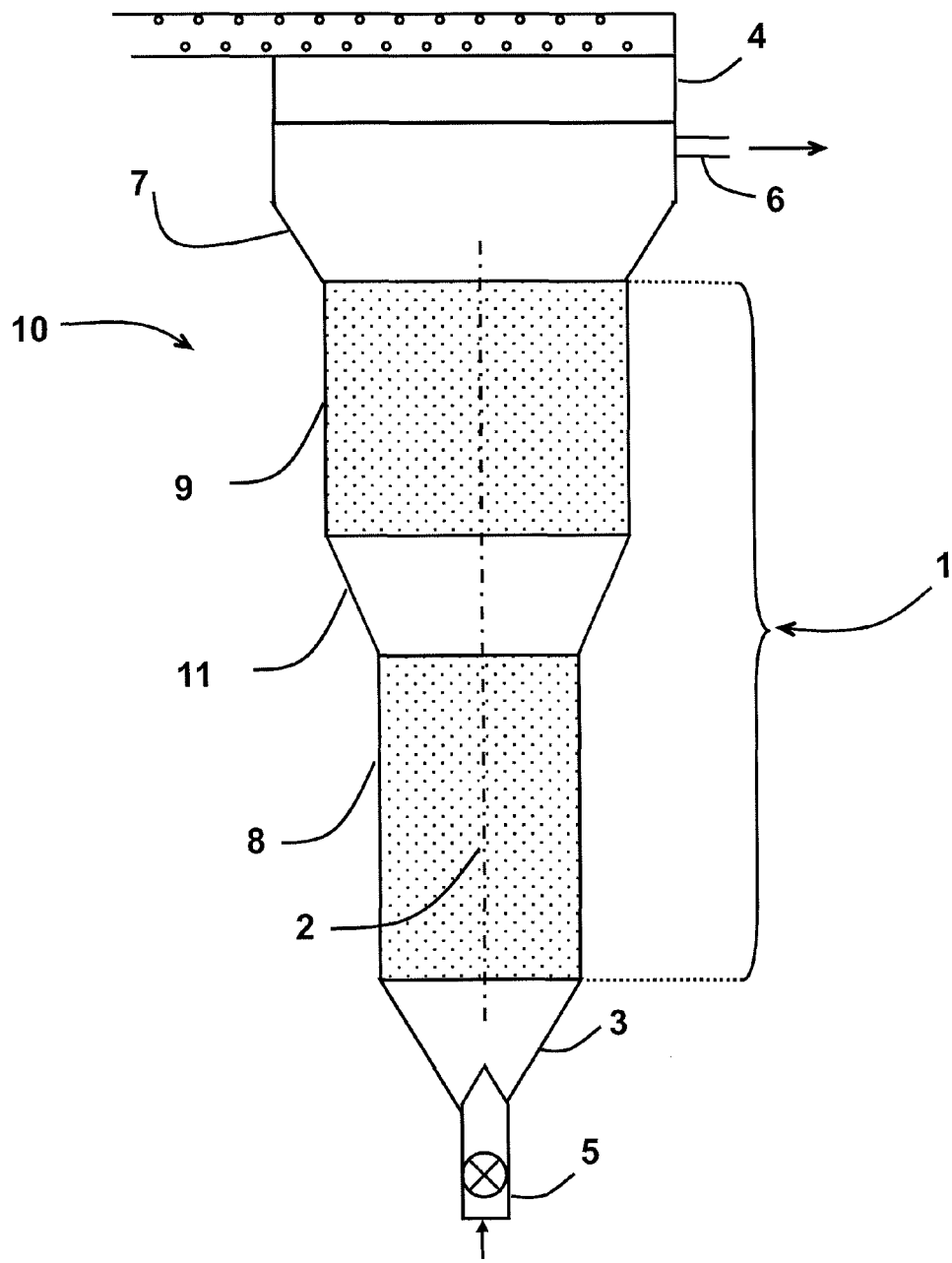
FIG. 1 schematically represents a device according to the invention.

As represented in FIG. 1, device 10 for carrying out liquid/solid redox reactions conventionally comprises a reactor body 1 extending along a longitudinal axis 2. Device 10 also comprises injection means, or means for performing feeding, of a solution to be processed and means for performing feeding of a reactive metal. Reactor body 1 is advantageously arranged, along longitudinal axis 2, between a feed chamber 3 and a feed hopper 4. The injection means are designed to feed in a solution to be processed via a first end of reactor body 1, and can comprise feed chamber 3 connected to a feed pipe 5.

Feed chamber 3 preferably has a flared shape towards reactor body 1. Feed chamber 3 is preferably configured so as to reduce the turbulences generated by the velocity of the injected solution as far as possible.

The reactive metal is input by the feeding means via a second end of reactor body 1 opposite the first end along longitudinal axis 2. The means for performing feeding of reactive metal can comprise feed hopper 4 which has the function of inserting the reactive metal generally in the form of balls, for example iron shot.

Feed pipe 5 can be provided with a check valve and enable the solution to flow from the first end to the second end of reactor body 1 forming a fluidized bed between injection means 5 and means for expelling the solution to be processed. Flow of the solution in the reactor body 1 is preferably an upward flow. In other words, reactor body 1 is vertical, the first end being directed downwards.

Device 10 further comprises a finishing compartment 7 mounted at the second end of reactor body 1. Finishing compartment 7 preferably has a flared shape from the second end of a reactor body 1, and is connected to the means for expelling the processed solution comprising for example an outlet duct 6. This flared shape of finishing compartment 7 generates a large reduction of the linear velocity of the mixture of the solution to be processed and of the particles of reactive metal in finishing compartment 7 before expel takes place.

According to the invention, reactor body 1 comprises at least two distinct reaction chambers 8 and 9. The two chambers 8 and 9 each have a constant cross-section perpendicularly to longitudinal axis 2. The respective cross-sections of reaction chambers 8 and 9 are different and increasing from the first end to the second end of reactor body 1. The cross-sections of reaction chambers 8 or 9 can be of a circular shape or of rectangular shape. Reactor body 1 can be constructed from preferably transparent plastic profiles thereby enabling the change of size of the particles of the reactive metal to be monitored during the liquid/solid reactions. The use of the two reaction chambers improves the yields of the device for carrying out liquid/solid reactions. According to the applications, the person skilled in the trade will be able to use more than two reaction chambers provided that they have different and increasing cross-sections from the first to the second end of reactor body 1.

The reaction chambers 8 and 9 can be connected to one another by a connection element 11 configured to adapt the shape of reaction chamber 8 to that of reaction chamber 9. Connection element 11 preferably has the shape of a cone or a trapezium, and is flared in the direction of the second end of reactor body 1. A flared shape both prevents accumulation of the reactive metal in connection element 11 and reduces the linear velocity of the solution passing from reaction chamber 8 to reaction chamber 9.

Reaction chambers 8 and 9 are further provided with suitable stirring means, not represented in FIG. 1, which enable the mixture of the solution and of the reactive metal to be stirred in reactor body 1. The stirring means can for example be of electromagnetic type or of ultrasonic type. Stirring means of electromagnetic type are more particularly suitable for cementation reaction chambers in which the particles of reactive metal contain iron. The electro-magnetic stirring means can for example comprise electromagnets each formed by a winding of copper wire around a soft iron core.

The stirring means are advantageously of ultrasonic type. In other words, the stirring means of the solution in reactor body 1 comprise ultrasonic transducers arranged at the periphery of an associated reaction chamber 8 or 9. The ultrasonic transducers are preferably arranged from the first to the second end of reactor body 1 and are laterally offset from one another. Distribution of ultrasonic transducers all along reactor body 1 increases the kinetics of the chemical reactions in device 10. This type of stirring means advantageously makes it possible to use balls of non-magnetic reactive metal, such as zinc, and to establish mixed beds with balls of different sorts, by adjusting the size of the latter according to their density.

The particles of reactive metal input via feed hopper 4 generally have a single granulometry. As the reaction progressively takes place, the size of the particles of reactive metal decreases. By using a reactor body provided with reaction chambers 8 and 9, the progressive reduction of the size of the particles of reactive metal is accompanied, in particular when the solution is input with a high flow rate, by a displacement of the particles the size of which has decreased from reaction chamber 8 to reaction chamber 9 having a larger cross-section. A fluidized bed is then maintained in reaction chamber 9, but also in reaction chamber 8 which comprises particles of reactive metal having a larger size than that of the particles of reaction chamber 9.

Thus, at equal flow rate, the particles of reactive metal removed from fluidized bed in the direction of outlet duct 6 remain in reaction chambers 8 and 9 for a longer time. The fluidized bed is maintained in reactor body 1, even with a high input flow rate of the solution, in spite of the reduction of the size of the particles of reactive metal when the liquid/solid reaction takes place. What is meant by high flow rate is a flow rate of more than 30 m$^3$/h. The particles of reactive metal expelled then have smaller sizes than in known devices. Reactor body 1 comprising reaction chambers 8 and 9 advantageously enables the liquid/solid contact surface to be increased and the kinetics of the reaction to be improved, thereby enabling savings to be made on the quantity of reactive metal fed into reactor body 1.

Device 10 for carrying out liquid/solid redox reactions in a fluidized bed can also comprise a liquid/solid separation element provided with a filter, not represented in FIG. 1 and advantageously located down-line from outlet means 6. The liquid/solid separation element advantageously comprises an element for injecting a neutral liquid into the filter in the opposite direction of flow to that of the processed solution. The element for injecting a neutral liquid enables the residual processed solution present in the filter cake to be substituted by a neutral liquid. What is meant by filter cake is the solid separated from the processed solution. This injection is preferably performed at the end of the liquid/solid reaction but also under density conditions of the filter cake enabling the residual processed solution to be substituted by a neutral liquid. Injection of the neutral liquid is preferably performed in such a way as to avoid generation of preferential channels which can leave parts of the filter cake immune to substitution of the residual solution by the neutral liquid.

The element for injecting a neutral liquid advantageously reduces pollution of the solids formed by the liquid/solid redox reactions with chemical compounds present in the solutions to be processed. For example purposes, the use of an element for injecting a neutral liquid enables the chlorine and arsenic content in a copper cement to be respectively reduced from 20% to 3% and from 8% to 0.5%.

A reactor body comprising at least two reaction chambers according to the invention advantageously enables the reaction time between the solution and the reactive metal in a fluidized bed to be increased. The yield of the liquid/solid redox reactions is thereby improved. Furthermore, the device according to the invention enables the reactive metal to be maintained in the reactor body, even at high flow rate, thereby reducing pollution of the solid formed by the liquid/solid reaction by the reactive metal.

The efficiency of a liquid/solid redox reaction in a fluidized bed depends to a great extent on the number of particles of reactive metal maintained in fluidization during the reaction. The number of particles of reactive metal in fluidization changes according to the modification of the mixture composed by the solution being processed, the particles of reactive metal and the powder of the solid formed by the liquid/solid redox reactions. It is consequently advantageous for means 4 for feeding a reactive metal via the second end of reactor body 1 to comprise a management system of the input quantity of said reactive metal. This input quantity can thus vary in the course of the reaction.

As the reaction progressively takes place, an optimal quantity of reactive metal is fed into reactor body 1 of device 10. The quantity of added reactive metal is neither linear with respect to the reaction time, nor empirical. The quantity of reactive metal is calculated by an algorithm according to the flow rate of the solution and to the measured concentrations of the solid to be formed in the solution to be processed before injecting of the latter into reactor body 1 and after expel thereof. The algorithm thus enables the quantity of reactive metal fed into reactor body 1 in the course of the liquid/solid reactions to be managed. In the case of the solution to be processed being acid, the algorithm can also take the degree of acidity into consideration to optimize feeding of the quantity of reactive metal so as to prevent the dissolution reaction of the reactive metal by the acid contained in the solution.

Management of feeding of the particles of reactive metal advantageously enables the contact surface between the reactive metal and the solution to be increased, consequently enhancing the transfer coefficient of the reactional exchanges between the particles of reactive metal and the solution to be processed.

A first example enables the yields of the liquid/solid redox reactions carried out in first and second devices to be compared. The first device, called "conventional device" according to the prior art, is provided with a single reaction chamber, and the second device is provided with two reaction chambers associated with a finishing compartment, configured according to an embodiment of the invention. The solution to be processed is injected into and expelled from the two devices with high flow rates of more than 20 m$^3$/h. The solution to be processed is a 5 g/l copper PLS (PLS standing for Pregnant Leaching Solution) having a constant temperature and PH. The reactive metal is fed into the first and second devices in the form of iron balls with a diameter of about 1.8 mm. When the reaction takes place, the fluidized bed extends in the two reaction chambers of the second device. Table 1 below represents a comparison between the yields of the liquid/solid redox reactions carried out in the first and second devices with different flow rates of the solution to be processed.

TABLE 1

| | Yield (%) | |
|---|---|---|
| Flow rate (m³/h) | Device with one reaction chamber | Device with two reaction chambers |
| 25 | 71 | 99 |
| 30 | 62 | 99 |
| 35 | 55 | 98 |
| 40 | 50 | 98 |

Table 1 shows that the yield of the liquid/solid redox reaction achieved in the second device provided with two reaction chambers is much higher than that associated with the conventional first device. Indeed, for a flow rate of 25 m³/h of the solution to be processed, the yield of the reaction carried out in the first device is 71% whereas it is 99% when the reaction is performed in the second device. Table 1 also shows that by using the first device, the yields decrease greatly from 71% to 50% when the flow rate of the solution increases from 25 m³/h to 40 m³/h. The use of the second device enables a yield of about 99% to be obtained, which remains substantially constant with the increase of the flow rate of the solution.

Furthermore, by using the second device and a flow rate of the solution equal to 35 m³/h, the iron content in the copper cement obtained remains less than 1%. Under the same reaction conditions but using the conventional first device, the iron content increases and remains higher than 5%.

Figure 2:
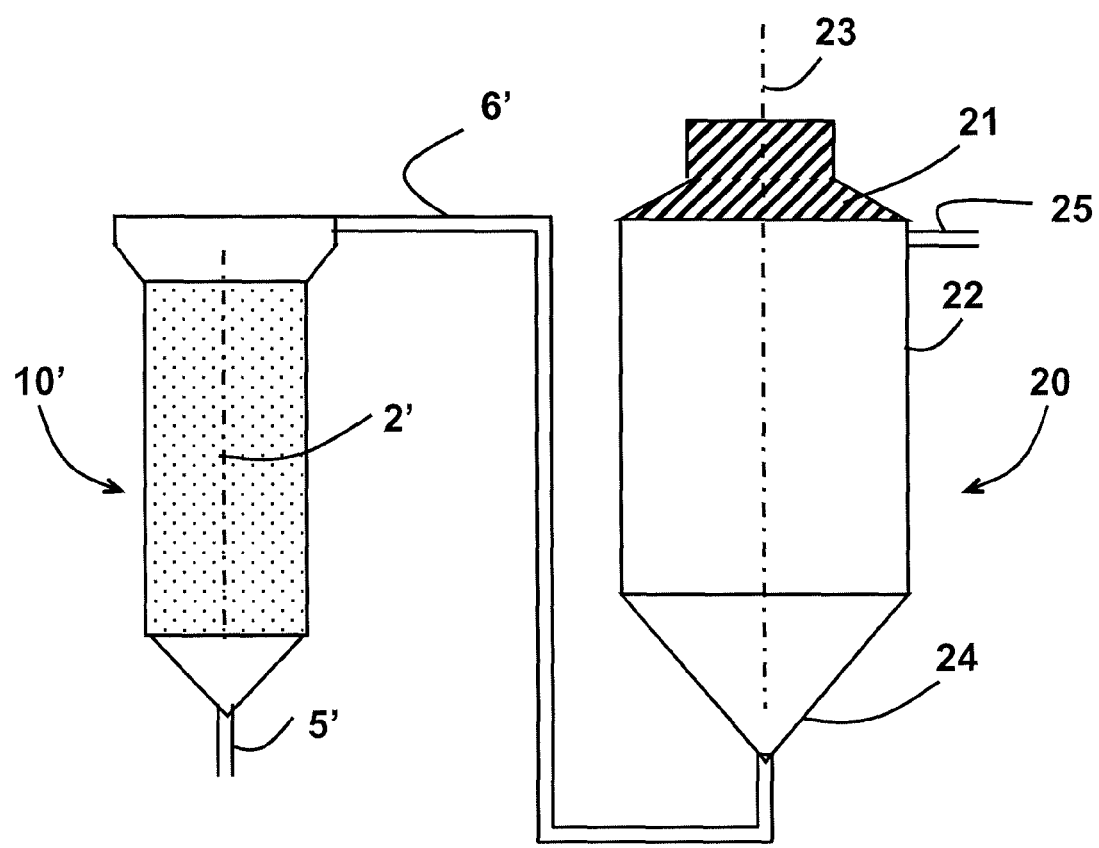
FIG. 2 represents a particular embodiment of a device according to the invention comprising an additional reactor connected to the device according to FIG. 1.

According to another embodiment represented in FIG. 2, an additional reactor 20 provided with mechanical stirring means 21 is connected to a device 10' for carrying out liquid/solid redox reactions via expelling means 6'. Device 10' is preferably a device according to the first embodiment of the invention. Device 10' can also be a device for carrying out liquid/solid redox reactions with one reaction chamber.

Additional reactor 20 comprises a central part 22 preferably of cylindrical shape and extending along a longitudinal axis 23. Longitudinal axes 2' of device 10' and 23 of central part 22 are preferably substantially parallel. Additional reactor 20 also comprises a feed device 24 mounted at a first end of central part along longitudinal axis 23. The central part preferably has a cylindrical shape and feed device 24 has a conical shape. Feed device 24 is connected to outlet duct 6' of device 10'. This connection enables injecting in the additional reactor 20 of the processed solution able to contain residual products of the liquid/solid redox reaction in a fluidized bed performed in device 10'. Liquid/solid redox reactions called second level reactions are thus carried out and enable processing of a mixture comprising said residual products.

Expel of the mixture processed in additional reactor 20 is performed at the level of a second end of central part 22 opposite the first end along longitudinal axis 23 where an outlet device 25 is arranged. Feed of the residual products to additional reactor 20 thereby enables a flow to be created from the first end to the second end of central part 22. This flow is preferably ascending and expel is performed by overspill. Advantageously, the volume of additional reactor 20 is 5 to 10 times larger than that of conventional device 10' with one reaction chamber, which enables the residence time of the residual products in the reactional medium of additional reactor 20 to be significantly increased. A large volume of additional reactor 20 also results in the general flow rate of an installation comprising device 10' and additional reactor 20 connected to one another not being reduced.

Additional reactor 20 also comprises mechanical stirring means 21. Mechanical means 21 can maintain a constant stirring of the residual products thereby preventing decantation of the solid products formed. In order to increase the yield of the reactions, additional reactor 20 is provided with mechanical means 21 for performing circular stirring and/or vertical stirring. For example purposes, the circular stirrer can comprise blades and vertical stirring can be determined by the design of the blades of the circular stirrer. Circular mechanical stirring means 21 combined with vertical stirring thus enable the solids formed by the reaction to be conveyed to the surface of the liquid where they are driven in the circuit. The stirring power generated by mechanical stirring means 21 is preferably greater than 150 rpm. Such a power advantageously prevents nuisance formation of particles of the metal formed, in additional reactor 20.

An additional reactor 20 and a device for carrying out liquid/solid reactions in a fluidized bed according to the first embodiment are complementary. The reactive metal of the reaction carried out in additional reactor 20 is in fact formed by the residual powder of the reactive metal resulting from the liquid/solid reaction performed in device 10. In the course of the liquid/solid reaction in a fluidized bed, the granulometry of the particles of reactive metal is progressively reduced in device 10 until it reaches a value of about a few hundred μm. These microparticles are then conveyed by the flow of the processed solution out of the fluidized bed device according to the first embodiment to additional reactor 20.

A second example enables a comparison of the yields of liquid/solid redox reactions implemented in a conventional first device with fluidized bed and a second device comprising an additional reactor provided with mechanical stirring means according to a particular embodiment of the invention. In this example, a solution to be processed and a reactive metal of the same type as those used in the first example described in the foregoing were fed into the devices to be compared. With a flow rate of 30 m³/h of the solution in the fluidized bed reactor, it was observed that provision of an additional reactor enables the yield of the liquid/solid reaction to be made to increase from 62% to 83%. The 83% yield was obtained by the additional reactor provided with a circular mechanical stirring means only. The use of circular mechanical stirring means associated with vertical stirring enables the yield to be further improved to reach a value of 98%.

A third example enables comparison of a series of liquid/solid reactions carried out with a constant flow rate of the solution equal to 20 m³/h and using a constant weight of reactive metal, in this instance iron. The reactions are performed by making the diameter of the iron balls vary from 1.1 mm to 2.2 mm for the different reactions of the series. The liquid/solid redox reactions in a fluidized bed were performed in the same devices as those of the second example. Table 2 below represents a comparison between the yields of the series of the liquid/solid reactions of the third example.

TABLE 2

| | Yield (%) | |
|---|---|---|
| Diameter (mm) | Device without additional reactor | Device comprising an additional reactor |
| 1.5 | 85 | 98 |
| 1.8 | 85 | 98 |
| 2.0 | 85 | 98 |
| 2.2 | 82 | 98 |

Table 2 shows that for use of a conventional first device, the yield of the liquid/solid redox reaction can decrease when the size of the iron balls becomes large. In fact, the increase of the size of the particles of the reactive metal results in a decrease of the liquid/solid contact surface thereby causing a decrease of the yield of the reaction from 85% to 82%. Table 2 also shows that when the reaction device comprises an additional reactor according to the second embodiment of the invention, the yield of the reaction remains constant with the increase of the diameter and presents a value of 98%.

Furthermore, analysis of copper cements shows that by using the conventional fluidized bed device, the iron content in the copper cement increases from 2 to 5% when the size of the iron balls decreases from 2.2 mm to 1.5 mm. Assembling an additional reactor according to the invention advantageously enables the iron content in the copper cement to be greatly reduced to reach a value of less than 0.1%.

Connection of the device for carrying out liquid/solid reactions in a fluidized bed with an additional reactor provided with mechanical stirring means advantageously enables the yield of the reaction to be improved and reduces the pollution of the solid formed by the liquid/solid reaction by the reactive metal.

Figure 3:
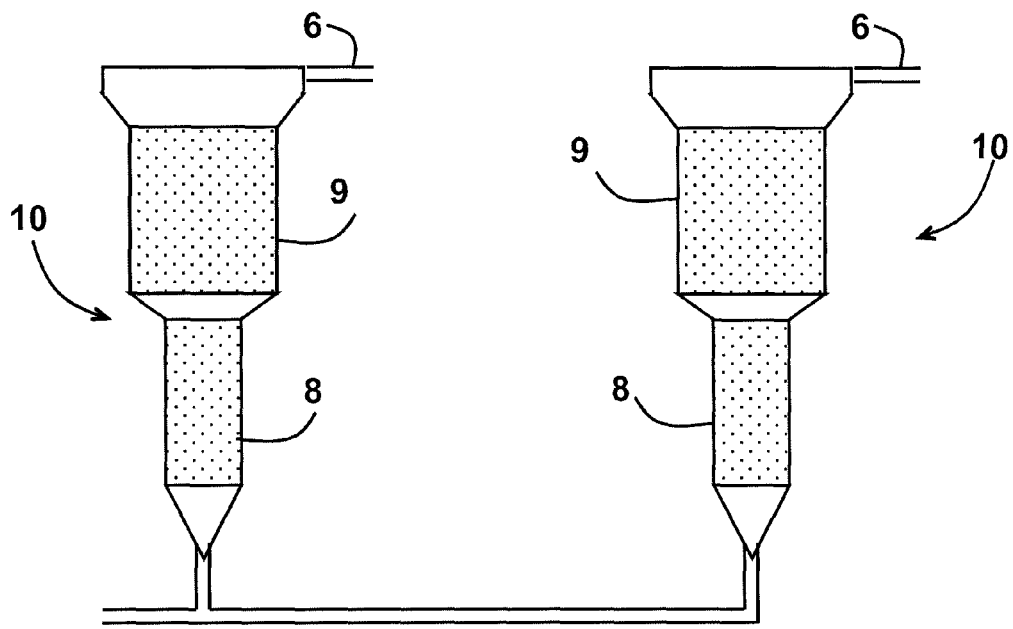
FIG. 3 represents a particular embodiment of parallel installation of devices according to FIG. 1.
Figure 4:
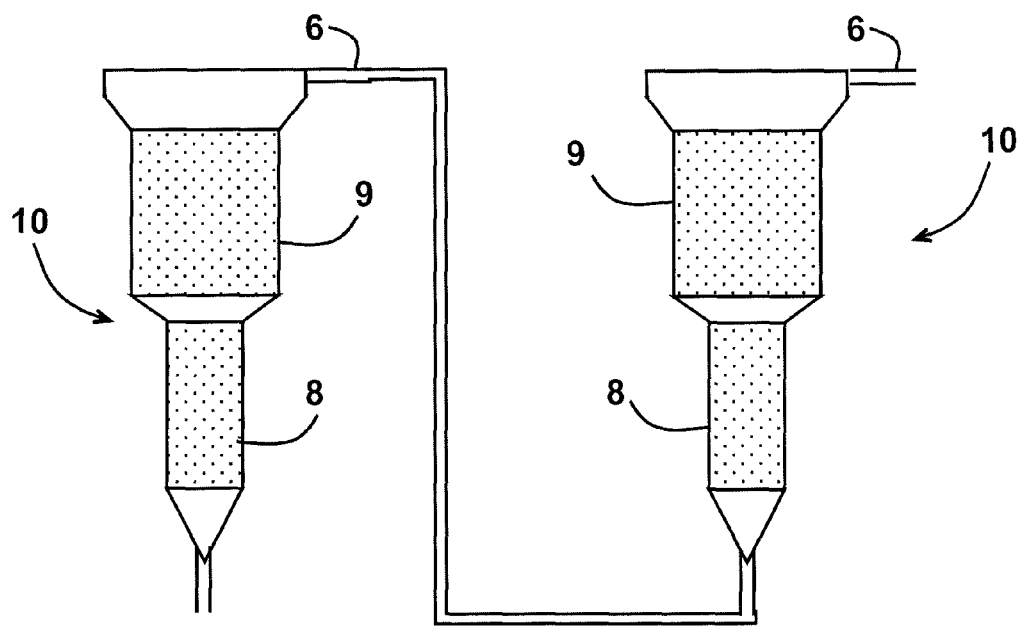
FIG. 4 represents a particular embodiment of series installation of devices according to FIG. 1.

As represented in FIGS. 3 and 4, two devices of the same type as device 10 according to the invention can be fitted respectively in parallel or in series. In other words, a system can be provided for carrying out liquid/solid redox reactions in a fluidized bed comprising two devices 10 according to the invention.

As represented in FIG. 3, devices 10 are assembled in parallel, their injection means 5 of the solution to be processed and expel means 6 of the processed solution being common. Parallel installation advantageously makes it possible to use a single injection circuit of the solution to be processed for the set of devices 10 assembled in parallel. The injection circuit enables a volume of the solution to be processed to be inject into each device 10 with flow rates that are able to depend on each device 10. Preferably, a reactor of the same type as additional reactor 20 can be connected to outlet ducts 6 of parallel-assembled devices 10.

As represented in FIG. 4, the two devices of the same type as device 10 according to the invention can be assembled in series, expel means 6 of a first device thereby forming inject means 5 of a second device. Series installation advantageously makes it possible to process highly concentrated solutions injected with high flow rates.

The invention claimed is:

1. A device for carrying out liquid/solid redox reactions in a fluidized bed comprising:
    a reactor body extending along a longitudinal axis;
    a feed pipe connected to a feed chamber arranged at a first end of the reactor body along the longitudinal axis, the feed pipe and the feed chamber being configured to inject a solution to be processed in the reactor body;
    a feed hopper arranged at a second end of the reactor body opposite the first end along the longitudinal axis, the feed hopper being configured to perform feeding the reactor body with a reactive metal;
    a stirrer system configured for stirring the solution in the reactor body;
    a finishing compartment mounted at the second end of the reactor body and connected to an outlet duct configured so as to expel the processed solution;
    wherein the reactor body comprises a first and second reaction chambers, having respectively a first and second constant cross-sections, perpendicularly to the longitudinal axis, the first and second constant cross-sections being different and increasing from the first end to the second end.

2. The device according to claim 1, wherein the outlet duct is connected to an additional reactor provided with a mechanical stirrer system, the additional reactor being configured to carry out the expelled processed solution.

3. The device according to claim 2, wherein the mechanical stirrer system is configured to perform circular stirring and/or vertical stirring.

4. The device according to claim 1, wherein the stirrer system comprises ultrasonic transducers arranged at the periphery of an associated reaction chamber.

5. The device according to claim 1, wherein the feed hopper comprises a management system of the input quantity of said reactive metal.

6. The device according to claim 1 comprising a liquid/solid separation element provided with a filter of the processed solution arranged down-line from the outlet duct, and an injecting element of a neutral liquid into the filter with an opposite direction of flow to that of the solution to be filtered.

7. A system for carrying out liquid/solid redox reactions in a fluidized bed comprising two devices according to claim 1.

8. The system for carrying out liquid/solid redox reactions in a fluidized bed according to claim 7, wherein the devices are assembled in parallel, their feed pipes of and outlet ducts being common.

9. The system for carrying out liquid/solid redox reactions in a fluidized bed according to claim 7, wherein the devices are assembled in series, the outlet duct of a first device being directly connected to the feed pipe of a second device.

* * * * *